United States Patent [19]

Mitsam

[11] Patent Number: 5,368,680
[45] Date of Patent: Nov. 29, 1994

[54] APPARATUS FOR APPLYING A STAMPING FOIL IMPRINT TO A WEB OF FLEXIBLE MATERIAL

[75] Inventor: Reinwald Mitsam, Langenzenn, Germany

[73] Assignee: Leonard Kurz GmbH & Co., Furth, Germany

[21] Appl. No.: 85,609

[22] Filed: Jun. 30, 1993

[30] Foreign Application Priority Data

Aug. 6, 1992 [DE] Germany ............................ 4226003

[51] Int. Cl.⁵ ............................................. B31F 5/00
[52] U.S. Cl. ................................... 156/555; 156/583.1; 100/93 RP; 492/7; 492/47
[58] Field of Search .................... 156/358, 555, 583.1, 156/582; 100/93 RP; 492/6, 7, 17, 42, 47

[56] References Cited

U.S. PATENT DOCUMENTS

| | | | |
|---|---|---|---|
| 3,840,420 | 10/1974 | Sarcia | 156/358 |
| 3,852,860 | 12/1974 | Tewes | 492/6 |
| 4,782,568 | 11/1988 | Halttula | 492/47 |
| 4,802,949 | 2/1989 | Mitsam | 156/540 |
| 4,923,558 | 5/1990 | Ellenberger et al. | 156/499 |
| 4,975,153 | 12/1990 | Nelson et al. | 492/7 X |
| 5,209,283 | 5/1993 | Miltzow et al. | 492/7 X |
| 5,257,965 | 11/1993 | Fuchs et al. | 492/6 |

FOREIGN PATENT DOCUMENTS

| | | | |
|---|---|---|---|
| 0358454 | 11/1972 | U.S.S.R. | 492/6 |
| 0563447 | 6/1977 | U.S.S.R. | 492/6 |

*Primary Examiner*—Michael W. Ball
*Assistant Examiner*—J. Sells
*Attorney, Agent, or Firm*—Louis E. Marn

[57] ABSTRACT

Apparatus for applying a stamping foil imprint to a web of flexible material comprises a main applicator roller and at least one backing roller co-operable with the main roller to press the web and the foil together, The at least one backing roller has an inner sleeve means and an outer sleeve means which is concentric with respect thereto. Between the inner sleeve means and the outer sleeve means is a gap in which there is arranged at least one elastically yielding annular compensating member which presses against the inner and the outer sleeve means.

9 Claims, 4 Drawing Sheets

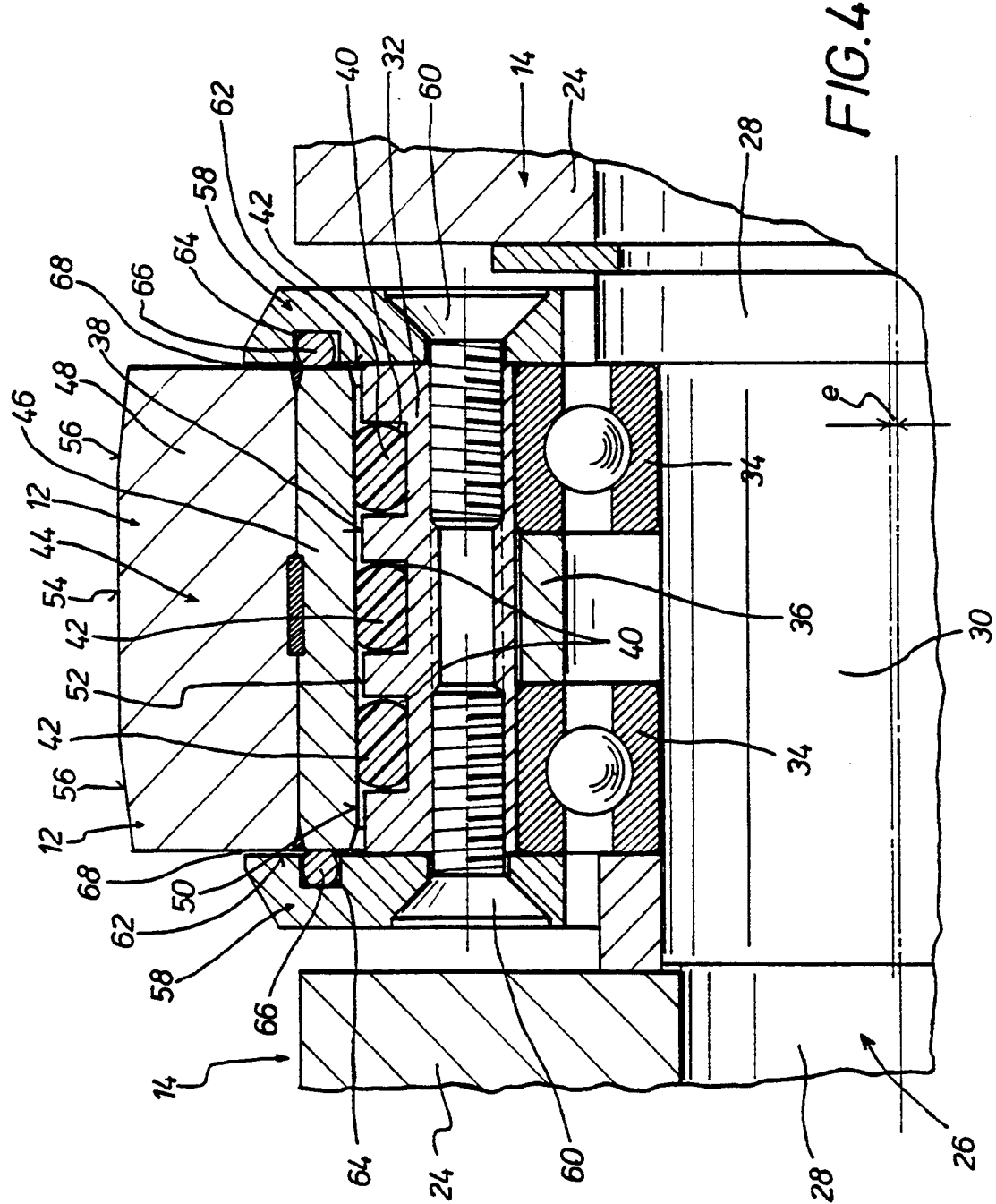

APPARATUS FOR APPLYING A STAMPING FOIL IMPRINT TO A WEB OF FLEXIBLE MATERIAL

BACKGROUND OF THE INVENTION

One form of apparatus for applying an imprint to a web of flexible material by means of a stamping foil which can also be referred to as an embossing or transfer foil, as is to be found for example in DE 32 10 551 C2, comprises a stamping or foil-applicator roller and at least one and more specifically a plurality of pressure or backing rollers, by means of which the foil and the web of material can be pressed against each other and against the peripheral surface of the stamping roller. In that assembly the backing rollers are disposed combined together in pairs on a respective roller cage. The backing rollers can be individually adjusted, in such a way that firstly one or two adjacent inner backing rollers and then progressively outwardly the further backing rollers can be brought to bear against the stamping roller. However, particularly when that apparatus is being used to deal with webs of flexible delicate or sensitive material such as for example banknote paper, it is not possible with certainty to exclude the likelihood of undesirable compression of the fibers of the material and thus an undesirable change in the properties of the material, as a result of the material being subjected to pressure over the full area thereof between the backing roller and the stamping or applicator roller.

In another form of apparatus, to be found in DE 40 24 537 C1, for applying a foil imprint to a web of flexible material, the aim therein is to avoid undesirable compression of the fibers of the material and thus an unacceptable change in the properties thereof, even when dealing with a web of flexible material to which a stamping or transfer foil imprint is to be applied, without the operating speed of the apparatus being adversely affected by the avoidance of fiber compression and its consequences. That aim is achieved by the at least one backing roller being provided with an adjusting device for producing defined adjustment of the spacing of the backing roller relative to the surface of the stamping or applicator roller, thereby to provide for defined adjustment of the pressure applied by the backing roller to the foil and the web of material.

However, tolerances in respect of thickness of the web of material and/or flaws in respect of shape caused by temperature conditions, for example out-of-roundness of the stamping or applicator roller, caused by a temperature variation, can result in irregular depths of impression of the at least one backing roller into the web of material, thus resulting in an irregular imprint effect.

SUMMARY OF THE INVENTION

An object of the present invention is to provide an apparatus for applying a stamping foil imprint to a flexible material, which can at least substantially reduce the differences in depth of impression of the at least one backing roller into the flexible material.

Another object of the present invention is to provide an apparatus for applying a foil imprint to a web of flexible material which, while being of a simple structure, provides for adaptation and adjustment of the apparatus structure to at least substantially reduce the effect of variations in operating conditions of the apparatus, which would be such as to have a disadvantageous effect on the result of operation of the apparatus.

Still another object of the present invention is to provide an apparatus for applying a foil imprint to a web of flexible material, which permits compensation for variations in the material and/or in components of the apparatus.

In accordance with the principles of the present invention, the foregoing and other objects are achieved by an apparatus for applying a stamping or transfer foil imprint to a web of flexible material, which includes a stamping or applicator roller and at least one backing roller co-operable to press the foil and the web of material against each other. The or each backing roller comprises an inner sleeve means and an outer sleeve means which is concentric with respect to the inner sleeve means and at a spacing therefrom to define a gap. At least one elastically yielding annular compensating member is disposed in the gap, pressing against the inner and outer sleeve means.

The at least one elastically yielding compensating member is disposed in the gap between the inner and outer sleeve means in such a way that it is subjected to a defined mechanical prestressing effect. That defined mechanical prestressing causes the inner sleeve means and the outer sleeve means of the corresponding backing roller to be in accurately centered relationship with each other. In the event of a radial loading on the backing roller, for example as a result of a variation in thickness of the web of material to which an imprint is to be applied by the apparatus and/or as a result of out-of-roundness of the applicator roller, due for example to temperature variations, the outer sleeve means can perform a resilient compensating movement relative to the inner sleeve means, by virtue of the interposition of the elastically yielding compensating member, and in that way the outer sleeve means can compensate for the variations in thickness of the web of material or the variations in shape of the applicator roller. As will be noted hereinafter a further advantage of the apparatus according to the invention is that the relatively small sprung mass of the backing roller, that is to say the sprung mass of the outer sleeve means thereof, provides that even short-length flaws or variations in the thickness of the web of material or in the applicator roller can be satisfactorily compensated at high apparatus operating speeds.

A preferred feature of the apparatus according to the invention, which affords the advantage of a simple and accurate arrangement of the at least one compensating member in the gap between the inner and outer sleeve means of the appropriate backing roller, provides that the inner sleeve means has an outer peripheral surface which is towards the outer sleeve means, that outer peripheral surface of the inner sleeve means having at least one peripherally extending recess for accommodating the associated compensating member. By virtue of suitable dimensioning of the at least one recess in the outer peripheral surface of the inner sleeve means and by suitably matched dimensioning of the cross-sectional profile of the compensating member or by virtue of a suitable choice of material for the compensating member, it is possible to fix the springing characteristic as between the inner sleeve means and the outer sleeve means which is limitedly movable relative thereto by virtue of the resilient nature of the compensating member therebetween, within wide limits, as required. In an advantageous aspect of this arrangement, if the radial dimension of the gap between the inner and outer sleeve means is of the order of magnitude of 0.5 mm, the material of the annular compensating member between the inner and outer sleeve means may desirably be of a hardness of between about 50 and 100 Shore, preferably between 60 and 90 Shore. Elastomer materials which exhibit such a level of hardness are obtainable. It is therefore desirable for the at least one compensating member to comprise a suitable rubber-elastic material of corresponding hardness.

In accordance with another preferred feature of the invention, the outer sleeve means has an inner sleeve member and an outer sleeve member which is concentric with respect thereto, wherein the inner and outer sleeve members comprise different materials and are mechanically fixedly connected together by suitable means. That thus provides for optimum adaptation to the properties of the material and/or the stamping or embossing properties of the material to which the imprint is to be applied. The inner sleeve member may comprise a suitable metal or metal alloy. The outer sleeve member may comprise a phenolic resin pressed material with cotton reinforcement or filler. It will be appreciated that other combinations of materials are also possible, depending on the respective purpose of use involved. The mechanically fixed connection between the inner and outer sleeve members of the outer sleeve means may be provided by a pressed connection and/or an adhesive connection.

In another preferred feature of the invention, the or each backing roller has an adjusting means for defined adjustment of the spacing of the backing roller relative to the applicator roller, thereby providing for defined adjustment of the pressure applied to the foil and the web of material. The inner sleeve means is desirably mounted by suitable mounting means on an eccentric portion of a mounting shaft of the adjusting means, the mounting shaft being mounted rotatably in concentric relationship on a mounting member. A scale-type adjusting means may be connected to the mounting shaft so that the eccentricity of the eccentric portion of the mounting shaft can be adjusted in a defined manner and fixed in the set position. It is possible in that way to provide for simple compensation in respect of dimensional tolerances, which is advantageous in particular when the or each backing roller is narrow in comparison with the applicator roller and is linearly displaceable, with the associated mounting member, on a carrier structure which extends parallel to the axial direction of the applicator roller. Particularly when the apparatus has a wide applicator roller, for example of an order of magnitude of around 500 mm and larger, and a carrier structure of corresponding length, the carrier structure may suffer from flexing phenomena which can be easily compensated by means of the above-mentioned adjusting arrangement.

In another preferred feature of the invention, an annular cover element can be provided at each side surface of the at least one backing roller, for laterally sealingly closing the gap between the inner and the outer sleeve means. It has been found desirable in such a configuration for the cover elements to be fixed to the inner sleeve means of the backing roller, while the outer sleeve member of the outer sleeve means projects radially beyond each of the two lateral cover elements. So that dimensional tolerances in respect of the inner and outer sleeve means in the axial direction can be easily overcome in such an apparatus structure, in accordance with a preferred feature of the invention, the inner sleeve means is axially wider than the outer sleeve means so that there is a gap between each cover element and the associated outer sleeve means, or the inner and outer sleeve members of the outer sleeve means. In order for that gap to be sealed off relative to the gap between the inner sleeve means and the outer sleeve means, the two cover elements are preferably provided at their axially inward sides with a respective peripherally extending circular groove. Disposed in each groove is an annular sealing element which projects into the corresponding gap between the cover element and the outer sleeve means and which bears sealingly against the outer sleeve means. The annular sealing elements not only provide for lateral guidance of the outer sleeve means in an axial direction, relative to the inner sleeve means, but they also prevent particles of dust and the like from penetrating into the gap between the inner and the outer sleeve means.

Further features, details and advantages of the invention will be apparent from the following description of a preferred embodiment.

BRIEF DESCRIPTION OF THE DRAWING

FIG. 4 is a view on an enlarged scale and partly in section of a part of the backing roller and a part of its mounting member.

DESCRIPTION OF THE PREFERRED EMBODIMENT

Figure 1:
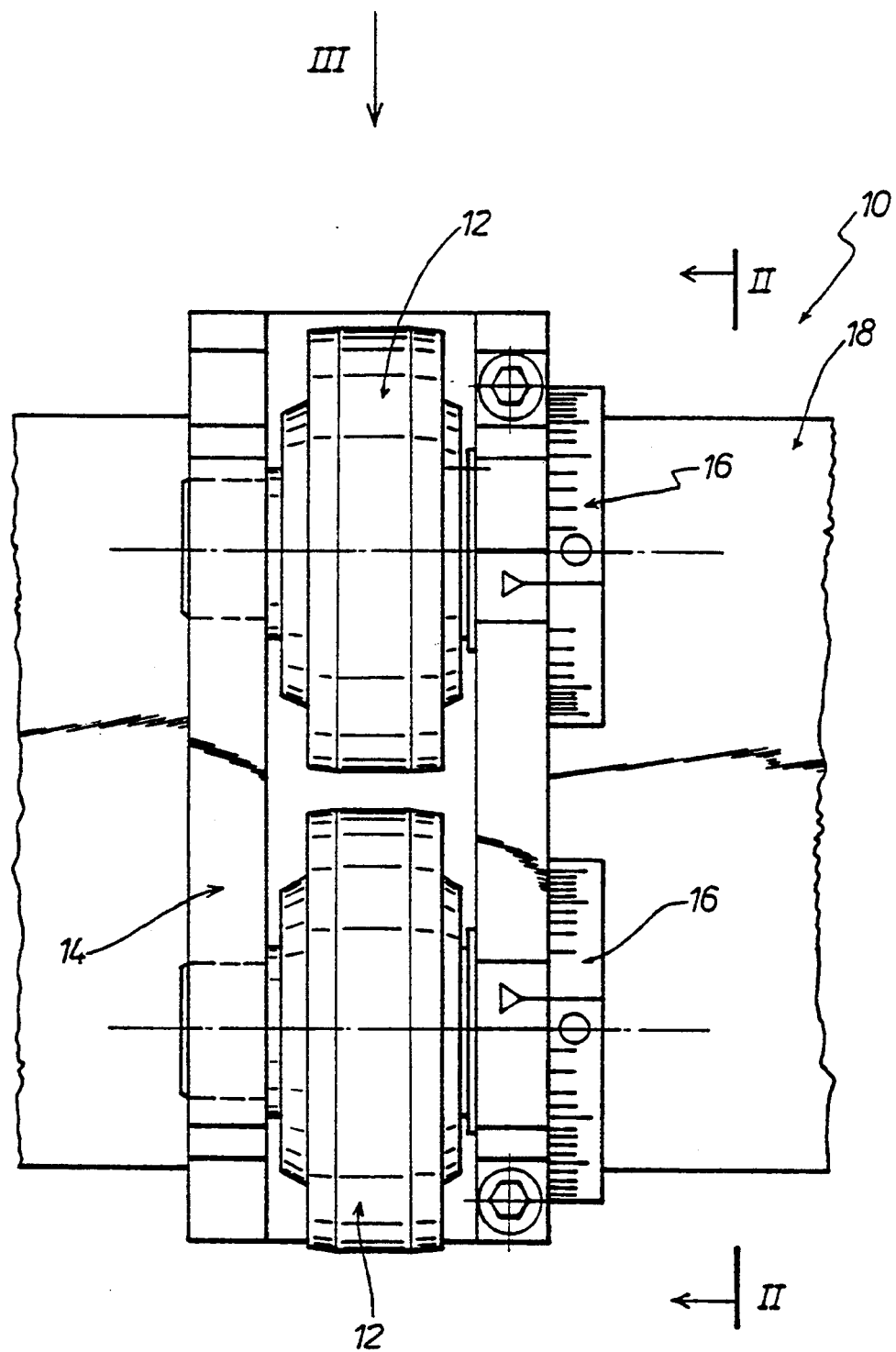
FIG. 1 is a view of part of the apparatus according to the invention viewing in the direction from the applicator roller (not shown in FIG. 1) towards a pair of backing rollers, only part of a carrier structure on which the backing rollers are linearly displaceably arranged being illustrated herein.

Referring firstly to FIG. 1, shown therein is a view from above of part of an apparatus indicated generally at 10 for applying a stamping or transfer foil imprint such as a printed making to a web of flexible material. The apparatus 10 includes a main stamping or applicator roller which is indicated at 20 in FIG. 2 but which is not shown in FIG. 1 in order to illustrate more clearly a pair of backing rollers 12 which co-operate with the roller 20 and which are mounted on a mounting member 14 rotatably in mutually parallel relationship. The roller 20 can be heated for operation of the apparatus.

Each backing roller 12 is adjustable as desired by means of an adjustment device generally indicated at 16, in relation to the roller 20 of the apparatus 10. The mounting member 14 is arranged to be linearly displaceable along a carrier structure 18 of which a part is shown in FIG. 1, as will be described in greater detail hereinafter.

Figure 2:
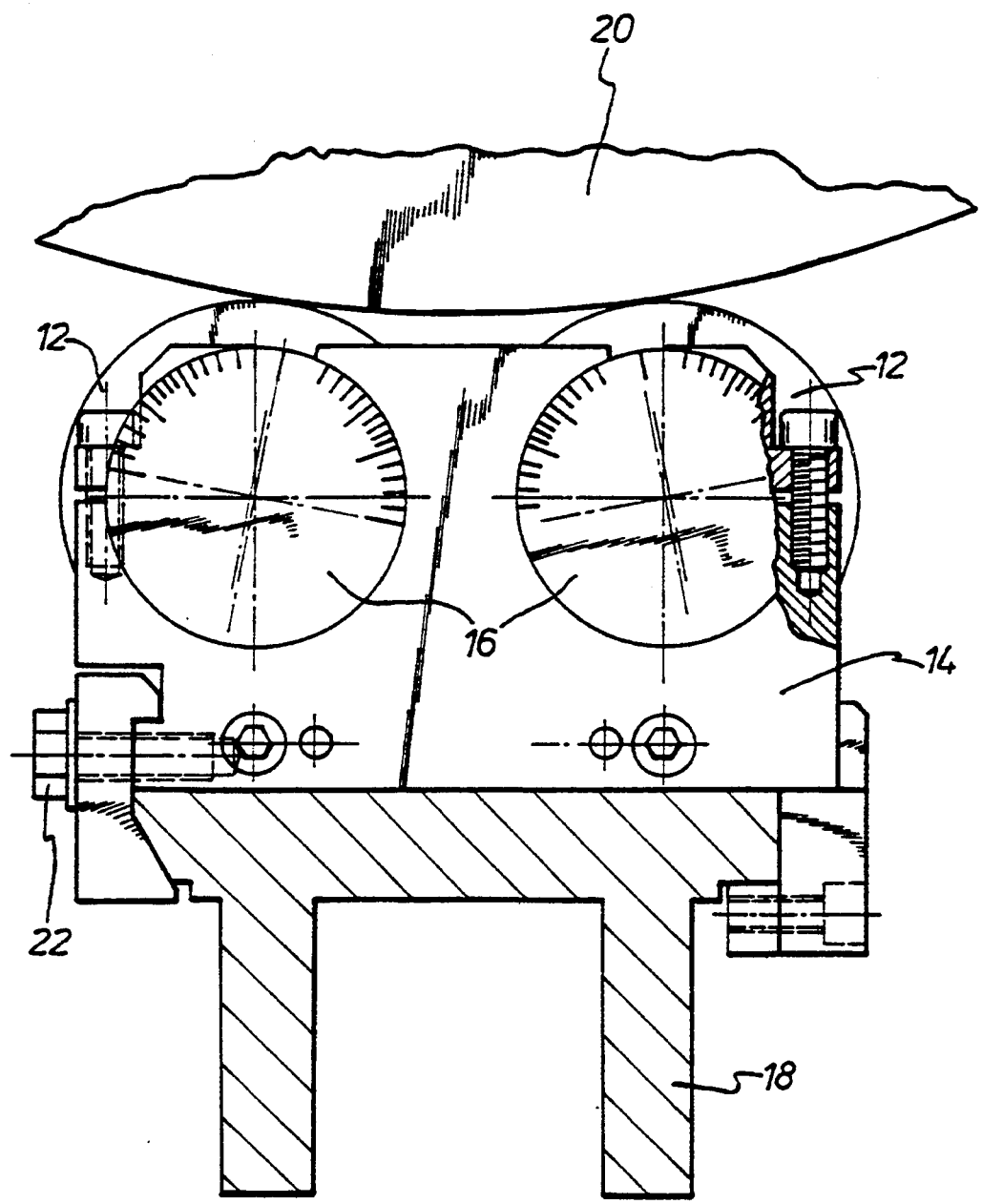
FIG. 2 is a view in section taken along line II—II in FIG. 1, showing only part of the applicator roller.

Reference will now be made to FIG. 2 showing the cross-sectional configuration of the carrier structure 18 on which the mounting member 14 carrying the pair of backing rollers 12 is arranged in such a way as to be guided linearly therealong. It will be seen that the carrier structure 18 extends with its longitudinal direction parallel to the axis of rotation of the roller 20. Reference numeral 16 in FIG. 2 again denotes the scale-type adjustment devices for the backing rollers 12 for adjustment as desired of the backing rollers 12 in relation to the heatable roller 20 of which a part is shown in FIG. 2. By virtue of adjustment of the backing rollers 12, as desired, relative to the roller 20, it is possible to provide for defined adjustment of the spacing of the corresponding backing roller 12 relative to the roller 20, thereby to provide for defined adjustment of the pressure applied to the stamping or transfer foil (not shown) which is passed through between the roller 20 and the backing rollers 12, and the web of material to which an imprint is to be applied by the foil.

Figure 3:
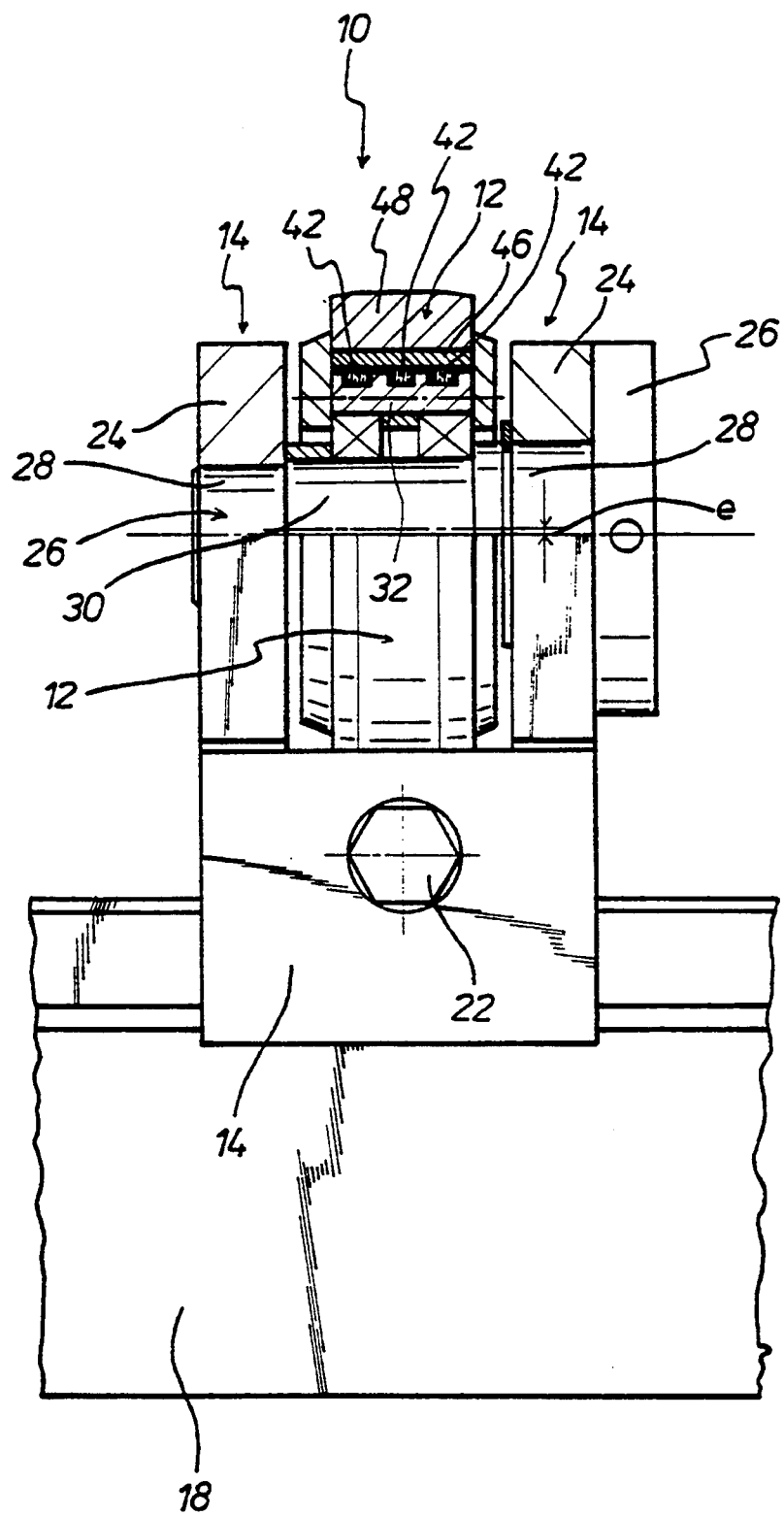
FIG. 3 is a view of the part of the apparatus shown in FIG. 1 viewing in the direction of the arrow indicated at III in FIG. 1, from the side of the unit, with the backing roller and the mounting member being shown partly in section.

Looking now at FIG. 3, this shows a side view of part of the carrier structure 18 on which the mounting member 14 for the pair of backing rollers 12 is linearly displaceably disposed. Reference numeral 22 (see also FIG. 2) denotes a screw member which permits the mounting member 14 to be fixed in a desired given position on the carrier structure 18. It can be seen from FIG. 3, and also from FIG. 4 to be described below, that a mounting shaft 26 is mounted on the mounting member 14 between two spaced-apart mounting limbs 24. The mounting shaft 26 has an eccentric portion 30 between two coaxial mounting portions 28 which are rotatably supported in the mounting limbs 24. The eccentric portion 30 has a degree of eccentricity as indicated at e in FIG. 3, in relation to the two lateral mounting portions 28 of the mounting shaft. Rotation of the mounting shaft 26, which is possible by means of the scale-type adjustment device 16, means that the associated backing roller 12 can be displaced as desired radially and consequently also relative to the roller indicated at 20 in FIG. 2.

As shown in FIG. 3, the or each backing roller 12 comprises an inner sleeve means 32 which is rotatably mounted on the eccentric portion 30 of the mounting shaft 26 by means of suitable mounting units which are indicated at 34 in FIG. 4 and which may be for example ball bearing assemblies. The mounting units 34 are maintained at a defined spacing from each other by means of a spacer ring which is indicated at 36 in FIG. 4. The inner sleeve means 32 is provided at its outer peripheral surface 38 in FIG. 4 with spaced-apart recesses 40 such as grooves which extend around the inner sleeve means 32 and which are provided for respectively accommodating an associated annular compensating member 42 comprising an elastically yielding material of suitable defined hardness.

The inner sleeve means 32 is concentrically surrounded by an outer sleeve means 44 which in turn comprises an inner sleeve member 46 and an outer sleeve member 48. The inner and outer sleeve members desirably comprise different materials, for example the inner sleeve member 46 comprising a metal or a metal alloy while the outer sleeve member 48 comprises for example a pressed phenolic resin material. The inner and the outer sleeve members 46 and 48 are suitably mechanically fixedly connected together, for example by adhesive means and/or by being a press fit one within the other.

The inside diameter of the outer sleeve means 44 or more specifically the inner sleeve member 46 of the outer sleeve means 44 is somewhat larger than the outside diameter of the inner sleeve means 46 so that a gap as indicated at 52 is formed between the outer peripheral surface 38 of the inner sleeve means 32 and the inner peripheral surface 50 of the outer sleeve means 44.

That gap 52 is bridged by the elastically yielding annular compensating members 42 which thus press both against the inner sleeve means 32 and against the outer sleeve means 44. Accordingly, thickness tolerances in respect of the web of material to which an imprint is to be applied, or thermally caused out-of-roundness phenomena in respect of the roller 20 of the apparatus 10 can be advantageously compensated by means of the elastically yielding compensating members 42 which are operatively disposed between the inner and the outer sleeve means 32 and 44 respectively.

In order to prevent edge imprint of the respective backing roller 12 in a sensitive or delicate web of material to which an imprint is to be applied by means of the apparatus, such as for example banknote paper, the outer peripheral surface 54 of the outer sleeve means 44 or, more specifically, the outer sleeve member 48 of the outer sleeve means 44, is bevelled or chainfeted at a small angle at each of its two edge portions as indicated at 56 in FIG. 4.

An annular cover element 58 is fixed by means of screws 60 to side surfaces of the respective backing roller 12 for sealingly closing the gap 52 between the inner and the outer sleeve means 32 and 44 respectively of the roller 12. Each cover element 58 is provided at its axially inwardly facing side 62 with a peripherally extending circular groove 64 which thus extends in the cover element 58 around the mounting shaft 26. Disposed in the groove 64 is an annular sealing element 66 of any suitable material. Each sealing element 66 bears not only against the associated annular cover element 58 but also against the outer sleeve means of the corresponding backing roller 12 so that access to the gap 52 between the inner and outer sleeve means 32 and 4 4 respectively is sealed off by means of the sealing element 66. In addition, limited axial mobility of the outer sleeve means 44 relative to the associated inner sleeve means 32 of the backing roller 12 is made possible by virtue of the presence of the two sealing elements 66. It will be seen from FIG. 4 that the sealing elements 66 more specifically co-operate with the inner sleeve member 46 of the outer sleeve means 44.

It will also be clearly seen from FIG. 4 that the inner sleeve means 32 is axially wider than the outer sleeve means 44, or the inner and outer sleeve meanbets 46 and 48 making up the outer sleeve means 44, so that a gap or clearance as indicated at 68 exists between each cover element 58 and the associated outer sleeve means 44. FIG. 4 also shows that the illustrated construction has three compensating members 42 which are disposed at axial spacings from each other between the inner and outer sleeve means 32 and 34 respectively. By virtue of such a design configuration with a plurality of compensating members 42, the outer sleeve means 44 or more specifically the inner and outer sleeve members 46 and 48 making up the outer sleeve means 44 can not only move with a radially resilient action with the axis thereof parallel to the axis of the mounting shaft 26, by virtue of the resilient deflection movement permitted by the compensating members 42, but to a slight degree the illustrated arrangement also permits the outer sleeve means 44 to move relative to the inner sleeve means 32 with a resilient differentiated movement, that is to say, a slight wobble or tilting movement, with the result that the size of the gap 52 between the inner and the outer sleeve means 32 and 44 respectively may in that situation vary over the axial extent of the backing roller 12. That has a positive and advantageous effect for example when dealing with papers requiring decoration, which have a watermark.

It will be noted that, if after a long period of use of such a backing roller as described above, the backing roller requires repair in some form, for example replacement of the at least one elastically yielding compensating member 42 between the inner and outer sleeve means 32 and 44, it is possible for the roller to be dismantled and refurbished as required, without involving a great deal of time.

Furthermore, while the above-discussed previous apparatuses which involve for example hydraulic pressure-regulated adjustment of the backing rollers relative to the applicator roller only permit compensation in respect of relatively large tolerances in thickness of the web of material and/or relatively severe temperature-induced out-of-roundness of the applicator roller, the above-described apparatus in accordance with the principles of the invention makes it possible to provide for satisfactory compensation of even comparatively small defects of that nature, while involving high apparatus operating speeds.

It will be appreciated that the above-described apparatus has been set forth only by way of example and illustration of the principles of the present invention and that various modifications and alterations may be made therein without thereby departing from the spirit and scope of the present invention.

What is claimed is:

1. An apparatus for applying a stamping foil imprint to a web of flexible material, which comprises:
    an applicator roller;
    a backing roller cooperable with said applicator roller to press together said stamping foil and said web of flexible material, said backing roller comprised of an inner sleeve member having an outer peripheral surface and a concentrically-spaced outer sleeve member defining a gap with said outer peripheral surface of said inner sleeve member, said outer peripheral surface of said inner sleeve member formed with a peripherally-extending recess;
    an annularly-shaped member of resilient material positioned between said inner sleeve member and said outer sleeve member and accommodated within said peripherally-extending recess;
    adjusting means for said backing roller for defined adjustment of spacing between said applicator roller and said backing roller, said adjusting means including a rotatable shaft having an eccentric portion; and
    means for mounting said inner sleeve member of said backing roller to said eccentric portion of said shaft.

2. The apparatus as set forth in claim 1 wherein said outer sleeve member is comprised of an inner sleeve portion and an outer sleeve portion concentric with respect thereto, and wherein said inner and outer sleeve portions are formed of different materials, said inner and outer sleeve portions fixedly coupled together.

3. The apparatus as set forth in claim 1 wherein said backing roller is narrow in comparison with said applicator roller, and further including a carrier structure parallel to axial direction of applicator roller, mounting support means linearly displaceable along said carrier structure for mounting said backing roller.

4. The apparatus as set forth in claim 1 and further including annular cover means for each side of said backing roller for closing said gap between said inner and outer sleeve members.

5. The apparatus as set forth in claim 4 wherein said annular cover means is fixed to said inner sleeve member of said backing roller and wherein said outer sleeve member extends radially beyond said cover means.

6. The apparatus as set forth in claim 5 wherein said inner sleeve member is wider than said outer sleeve member defining a gap between said annular cover means and said outer sleeve member.

7. The apparatus as set forth in claim 6 wherein said annular cover means has a peripherally-extending circular groove; and wherein an annular sealing element is positioned within said groove projecting into said gap between said annular cover means and said outer sleeve member and bears sealingly against said outer sleeve member.

8. An apparatus for applying a foil imprint to a web of flexible material including a main roller for applying the foil against the material and a plurality of backing rollers co-operable with the main roller to press the foil and the web of material against each other as the foil and the web of material pass between the main roller and the backing rollers, each said backing roller comprising:
    a mounting shaft means for rotatably supporting the backing roller;
    an inner sleeve means carried on said mounting shaft means, an outer sleeve means disposed around said inner sleeve means at a spacing therefrom to define a radial gap therebetween;
    at least one annular compensating member of resiliently yielding material disposed in said gap between said inner and outer sleeve means and adapted to press against said inner and outer sleeve means thereby to hold said inner and outer sleeve means in at least substantially mutually concentric relationship while permitting resilient movement of said outer sleeve means relative to said inner sleeve means by virtue of a variation in said gap therebetween;
    wherein one of said sleeve means is formed with a groove extending peripherally about a peripheral surface facing towards the other of said sleeve means, and said compensating member being positioned within said groove.

9. The apparatus as set forth in claim 8 wherein said groove is in a radially peripheral surface of said inner sleeve.

* * * * *